INVENTOR.
WALTER A. GRAF, JR.
BY Christie, Parker + Hale
ATTORNEYS

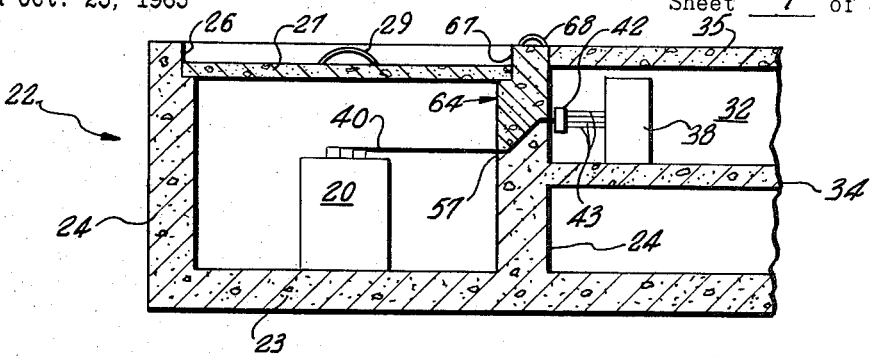
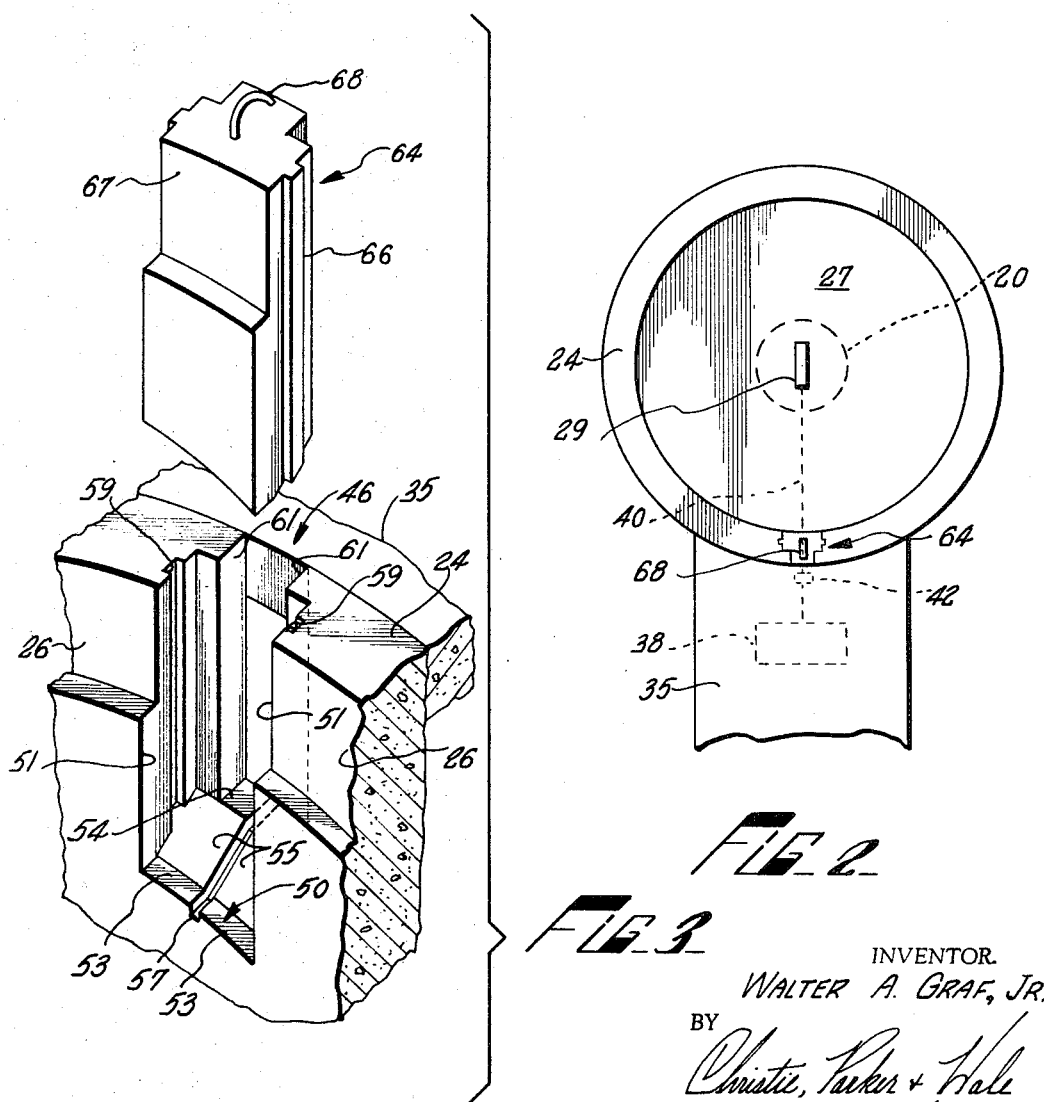

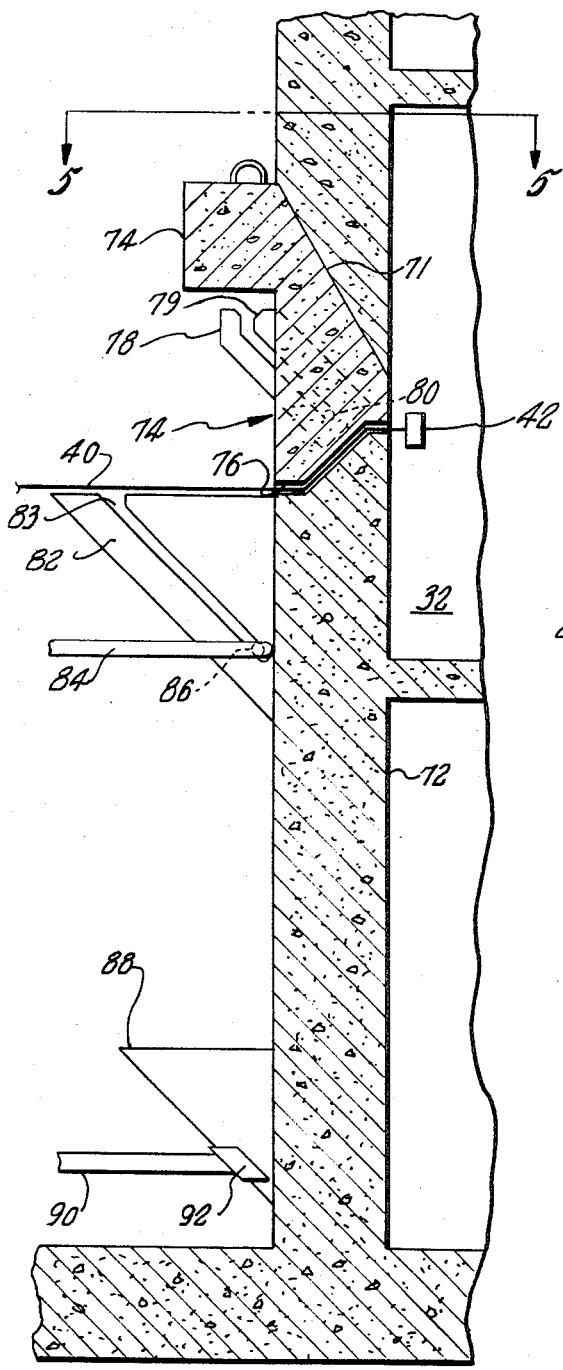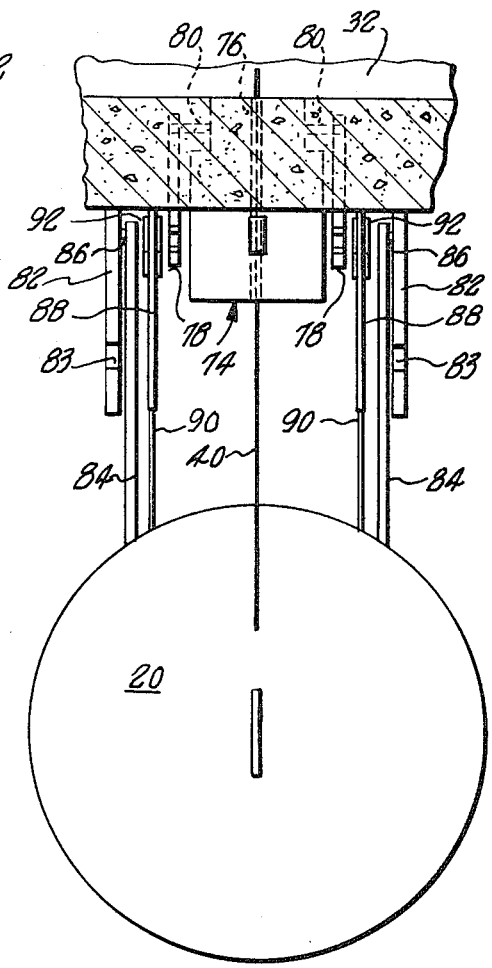

United States Patent Office 3,436,544
Patented Apr. 1, 1969

3,436,544
RADIATION SHIELD INCLUDING
REMOVABLE PORTION
Walter A. Graf, Jr., Saratoga, Calif., assignor to General
Electric Company, New York, N.Y., a corporation of
New York
Filed Oct. 23, 1965, Ser. No. 503,569
Int. Cl. G21h 5/00
U.S. Cl. 250—106                                           11 Claims

ABSTRACT OF THE DISCLOSURE

An improved means for passing service lines through a radiation shield surrounding a radioactive source is described. The shield includes a gap with a removable plug fitted therein, with a non-line-of-sight channel for the service lines extending between the plug and wall. Several embodiments of the plug and plug guide means are also described.

---

A device incorporating highly radioactive material is typically enclosed in a thick-walled housing or "cell." The cell is a barrier to radiation emitted from the device, and shields personnel outside the cell from the radiation. Service lines from the device, such as pipes and electrical cables, pass through a wall of the cell to a remote-control station located in a safely inhabitable area.

It is often necessary to provide for periodic removal of the device from the cell for refueling or other maintenance. Removal is typically accomplished by opening the top of the cell and lifting the device with a crane positioned above the cell. To free the equipment from the remote control station before removal, the service lines must be disconnected.

In the past, this disconnection has sometimes been made by uncoupling connectors secured to the device and to the ends of the service lines. As the connectors are in the hazardous environment within the cell, the connectors must be uncoupled with remotely operated mechanical manipulators. Alternatively, auxiliary shielding and decontamination procedures may be required to permit direct access to the connectors by suitably protected personnel.

Both of these disconnection procedures present certain disadvantages in terms of expense, complexity and consumption of time. Mechanical manipulators are costly, occupy valuable space, and are often awkward and slow to operate. The direct-access technique requires extra shielding, as well as involving the delay and expense of decontamination of the area around the device.

The radiation shield of this invention overcomes these disadvantages, and provides a safe, simple and inexpensive means for conducting service lines secured to and extending from the device through the cell wall to an inhabitable area. Disconnection of the service lines is accomplished in the inhabitable area, and removal from the cell of the device and the attached service lines is made possible by removing a portion of the radiation shield.

The shield may be arranged to permit the device to be lifted straight up from the cell floor without any horizontal motion. Alternatively, a guidance system may be provided to direct the device and the attached service lines through a limited horizontal motion to provide clearance from the cell wall as they are lifted.

Briefly stated, the radiation shield of this invention comprises a wall having a gap, and a removable plug fitting in the gap. The assembled plug and wall define a channel through which service lines from a radioactive device extend into an inhabitable area. The channel is a non-line-of-sight opening between the inhabitable area and the area occupied by the radioactive device.

In another form, the invention includes means for guiding the plug upwardly and laterally away from the wall toward the device. Means may also be provided for guiding the device upwardly and laterally away from the gap to insure that the service lines secured to the device do not strike the top or sides of the gap.

The invention will be described in detail with reference to the attached drawings in which:

FIG. 1 is a cross-sectional elevation of a reactor housing having a radiation shield constructed according to this invention;

FIG. 2 is a plan view of the housing shown in FIG. 1;

FIG. 3 is a fragmentary perspective view of a wall of the housing, showing the gap and removable plug;

FIG. 4 is a cross-sectional elevation of an alternative form of the invention;

FIG. 5 is a view taken on line 5—5 of FIG. 4;

Figure 6:
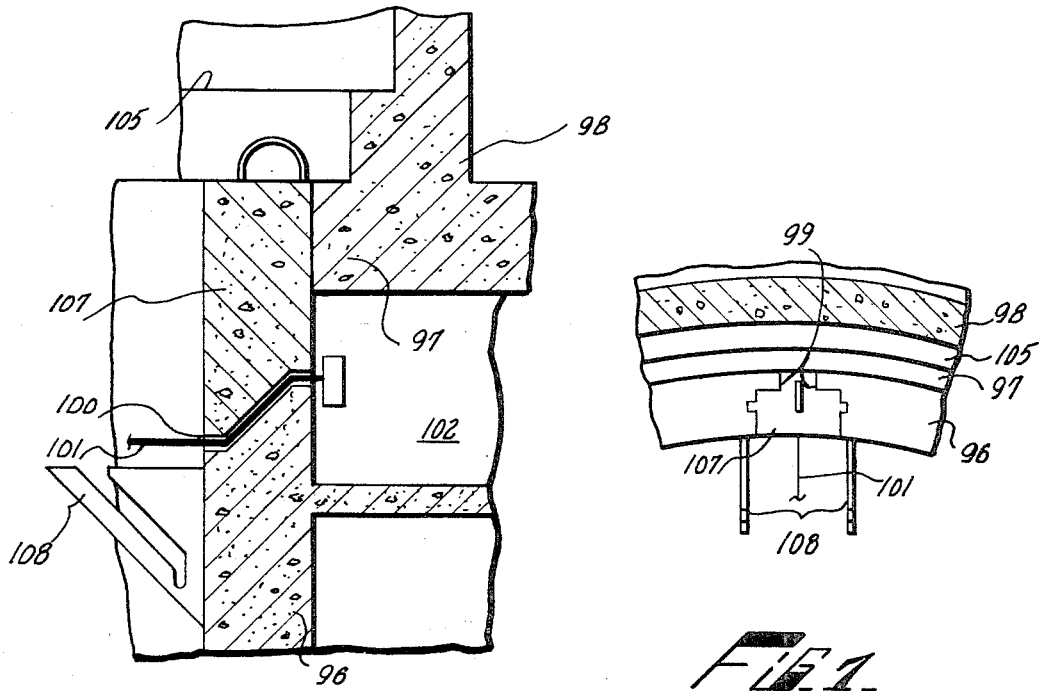
FIG. 6 is a cross-sectional elevation of another alternative form of the invention.

Referring to FIGS. 1 through 3, a radioactive device 20 such as a nuclear reactor is enclosed in a thick-walled housing or cell 22. The cell is typically constructed of concrete, and includes a floor 23 and an upright cylindrical wall 24. The wall has an annular recess 26 at its upper end, and a removable cell cover 27 rests on the bottom of the recess. A lifting hook or bail 29 is secured to the top of the cell cover.

An inhabitable area 32 is located in another part of the cell structure, and is separated from the radioactive device by a portion of wall 24. The inhabitable area has a floor 34 and a ceiling 35 which are secured to and extend from wall 24. The wall serves as a radiation shield, protecting personnel in the inhabitable area from radiation emitted by the radioactive device.

Disposed within the inhabitable area is a remote-control panel 38 which is used to monitor and control device 20. A number of service lines 40 extends from the device to the remote control panel. The service lines typically include utility connections as well as instrumentation cables, and the lines are secured together to form a stiff bundle which will hold its shape. The service lines are secured at one end to the radioactive device, and extend through the cell wall to terminate in a group of connectors 42 in the inhabitable area. A series of interconnecting lines 43 from the remote-control panel are coupled to the connectors.

As best seen in FIG. 3, a portion of wall 24 has an aperture or gap 46 which extends between the inhabitable area and the interior of the cell occupied by the radioactive device. The gap is defined by a floor 50 and two upright surfaces 51 of the wall.

Floor 50 includes two spaced-apart horizontal portions 53 and 54 which are joined by a sloping portion 55. A channel 57, of adequate size to accept the bundle of service lines, is recessed in the floor and extends through the wall. Upright surfaces 51 include vertical channels 59 on each side of the gap. The upright surfaces include a stepped section 61 defining a narrowed portion of the gap.

A plug 64 is removably fitted into the gap. The plug is configured to fit snugly into the gap, with outwardly extending vertical rails 66 on each side to engage channels 59. The plug is recessed to engage the stepped portion of the upright surfaces and has a sloped lower portion to rest snugly against the floor of the gap. The upper inner surface of the plug has a recess 67 making a smooth continuation of annular recess 26 in the wall. A hook or lifting bail 68 is secured to the top of the plug.

When the plug is lowered into place in the gap, channel 57 and the bottom of the plug cooperate to enclose the bundle of service lines extending from device 20 through the cell wall to the inhabitable area. As best seen in FIG. 1, the sloping portion of channel 57 creates a non-line-of-sight opening, preventing radiation from the radioactive device from reaching the inhabitable area through the channel. Furthermore, the stepped portion of the upright surfaces and the sloping floor of the gap define non-line-of-sight interfaces between the bottom and sides of the plug and gap, preventing passage of radiation through these paths.

When device 20 is to be removed from the cell for refueling or other maintenance, connectors 42 are uncoupled from lines 43. This operation is performed without any special shielding or decontamination procedures because the connectors are located in the safe environment of inhabitable area 32. Uncoupling the connectors prepares the device 20 and attached service lines 40 to be removed from the cell as a unit. Inhabitable area 32 is then evacuated, or auxiliary shielding (not shown) is put in place, to prepare for removal of plug 64.

Cell cover 27 is then lifted out of place by engaging lifting bail 29 with the hook of an overhead crane (not shown). Plug 64 is next removed from the cell wall by engaging lifting bail 68 with the crane hook. When the plug is lifted out of place, the bundle of service lines is freed, and device 20 and the attached service lines may be lifted out of the cell.

In order to reduce the height of the removable plug, it may be desirable to define a gap through the cell wall which does not extend to the top of the wall. Such an arrangement is shown in FIGS. 4 and 5 where a gap 71 in a wall 72 stops short of the top of the wall. A plug 74 is fitted into a gap from the side, the plug and gap defining a non-line-of-sight opening 76 through which service lines 40 from the radioactive device extend into inhabitable area 32. The structure of the gap floor and plug bottom is substantially identical to that already described and illustrated in FIGS. 1 through 3, and, for brevity, is not repeated.

To position the plug within the gap, two guide brackets 78 are secured to wall 72 on opposite sides of the gap. Each bracket includes a sloping slot 79. A pair of guide pins 80 are secured to opposite sides of the plug and engage slots 79. The plug is lowered by an overhead crane until pins 80 engage the top of slots 79. As the plug continues to be lowered, it is guided laterally into the gap as the pins slide down the sloped slots.

A similar lifting-guide arrangement may be used for the radioactive device, and includes a pair of brackets 82 secured to wall 72. Each bracket includes a sloping slot 83. A pair of guide arms 84 are secured to and extend laterally from the radioactive device. At the end of each guide arm is a guide pin 86 which engages a respective slot 83. A pair of sloping guide rails 88 are secured to wall 72 near its bottom. A second pair of guide arms 90 are secured to and extend laterally from the radioactive device to terminate in U-shaped shoes 92 which engage the guide rails.

When the radioactive device is to be removed from the housing, an overhead crane lifts the device which is guided upwardly and laterally away from the gap by pins 86 sliding in slots 83. The lateral motion of the device insures that the bundle of service lines clears the sides and top of the gap during removal. The bottom of the radioactive device is prevented from swaying by shoes 90 which ride along guide rails 88. This process is reversed when the device and attached service lines are reinstalled in the cell, the guide pins and slots cooperating to move the device downwardly and laterally toward the gap until the device rests on the floor of the housing.

Figure 7:
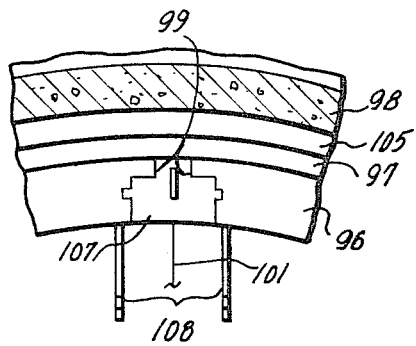
FIG. 7 is a top view of the invention as shown in FIG. 6.

An alternative form of the invention is shown in FIGS. 6 and 7. In this form, the housing includes an offset wall having an upright, inner lower section 96, a horizontal overhang section 97 extending outwardly from the top of section 96, and an upright outer upper section 98 extending upwardly from the overhang section. Wall section 96 includes a gap 99 and a channel 100 for service lines 101 which extend from a radioactive device in the cell into an inhabitable area 102. Wall section 98 includes an annular recess 105 to provide a support for a cell cover (not shown).

The offset wall permits use of a short removable plug 107 which can be lifted vertically upward without the use of guide brackets or other lateral guidance means. A pair of guide brackets 108 are secured to wall section 96 to guide the radioactive device laterally away from the gap during removal to insure clearance of the service lines from horizontal wall section 97.

Figure 8:
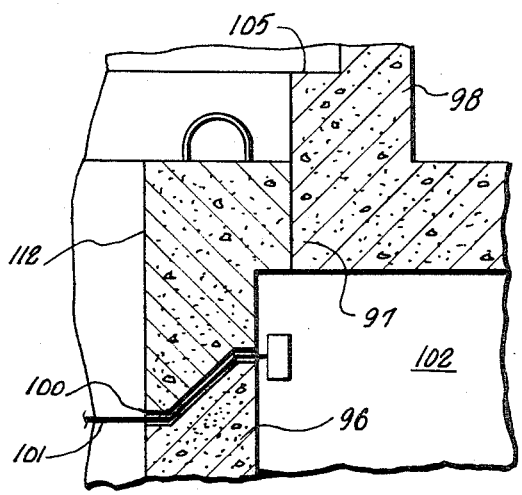
FIG. 8 is a cross-sectional elevation of still another alternative form of the invention.
Figure 9:
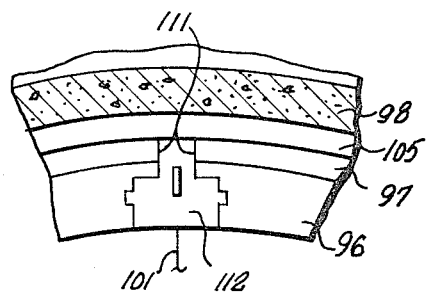
FIG. 9 is a top view of the invention as shown in FIG 8.

If it is desirable to eliminate lateral guide brackets for the radioactive device as well as for the removable plug, the configuration shown in FIGS. 8 and 9 may be used. This configuration is similar to the arrangement shown in FIGS. 6 and 7, but includes a gap 111 which extends through both upright wall section 96 and overhang wall section 97. A removable plug 112 fits in the gap to extend horizontally outward beyond the outer termination of the service lines. The offset wall permits plug 112 to be withdrawn vertically, and the gap in the overhang wall section permits the radioactive device and attached service lines to be withdrawn vertically from the cell.

A radiation shield has been described which permits a radioactive device to be removed from its housing or cell without the use of complex remote manipulators, auxiliary shielding, or special decontamination procedures. The radiation shield may be provided in various alternative forms to suit specific cell structures and radioactive-device configurations, and it is intended that such modifications be encompassed within the scope of the invention as defined by the appended claims.

I claim:

1. In a thick walled housing for a radioactive source having service lines connecting the source to an inhabitable area; a radiation shield comprising a wall having a gap and a removable plug fitting in said gap; the plug and wall when assembled defining a channel therebetween through which the service lines extend, the channel being a non-line-of-sight opening between the source and the inhabitable area, said channel becoming substantially larger as said plug is removed from said gap.

2. The assembly defined in claim 1, wherein said service-lines extend through said channel without pressure thereon.

3. The assembly defined in claim 1 wherein cooperating guide means are provided on said plug and the sides of said gap guiding said plug into position in a vertical plane perpendicular to said wall.

4. The assembly defined in claim 3 wherein said guide means comprises cooperating grooves and ridge portions movably fitting therein on said plug and said gap sides.

5. The assembly defined in claim 4 wherein said grooves are arranged vertically whereby the plug is guided upwardly out of said gap.

6. The assembly defined in claim 4 wherein said grooves are arranged at a angle to the vertical whereby the plug is guided upwardly and laterally out of said gap.

7. The assembly defined in claim 5 wherein second cooperating guide means are provided on said source and source support so that said source moves upwardly and laterally away from said wall when lifted.

8. In a thick walled housing for a radioactive source having service lines connecting the source to an inhabitable area; a radiation shield comprising a vertical wall section surrounding said source and a horizontal section extending outwardly from the top of said vertical wall section; the top of said vertical wall section having a gap; and a removable plug fitting in said gap, the plug and wall when assembled defining a channel therebetween through which the service lines extend, the channel being a non-line-of-sight opening between the source and the inhabitable area.

9. The assembly defined in claim 8 wherein guide means comprising cooperating grooves and ridge portions are provided on said plug and wall, said grooves arranged at an angle to the vertical whereby said plug is guided upwardly and inwardly of said wall out of said gap.

10. The assembly defined in claim 9 wherein second angled guide means are provided on said source and a. source support whereby said source and said service lines can be lifted out of the housing.

11. The assembly defined in claim 8 wherein said gap extends partially into said horizontal section.

References Cited

FOREIGN PATENTS 989,167  4/1965  Great Britain.

RALPH G. NILSON, *Primary Examiner.*

A. B. CROFT, *Assistant Examiner.*

U.S. Cl. X.R.

176—87; 250—108